S. B. HAZARD.
RIDING ATTACHMENT FOR HARROWS.
APPLICATION FILED DEC. 17, 1906.
No. 902,879.
Patented Nov. 3, 1908.
3 SHEETS—SHEET 1.
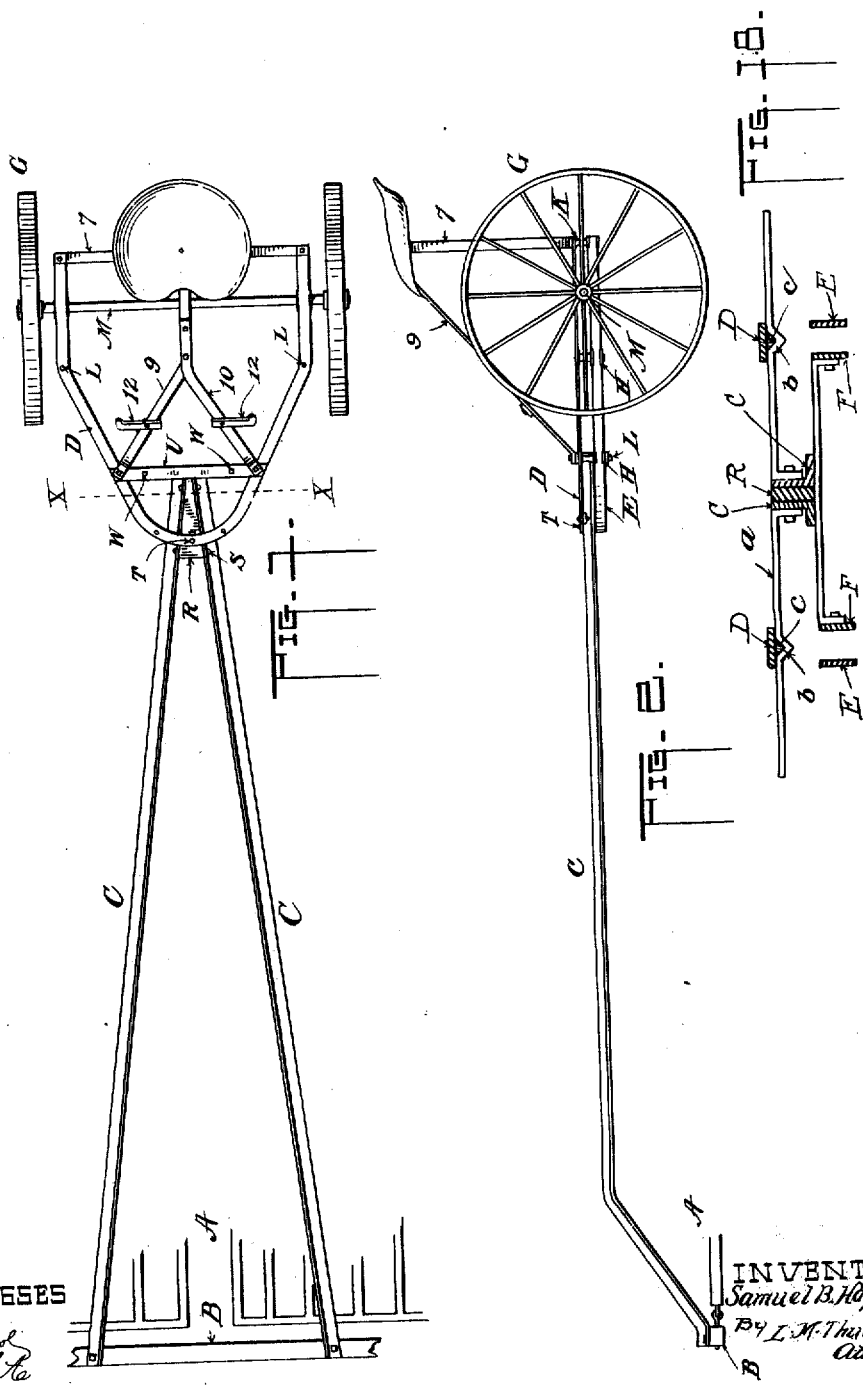
WITNESSES
INVENTOR
Samuel B. Hazard
By L. M. Thurton
Atty.

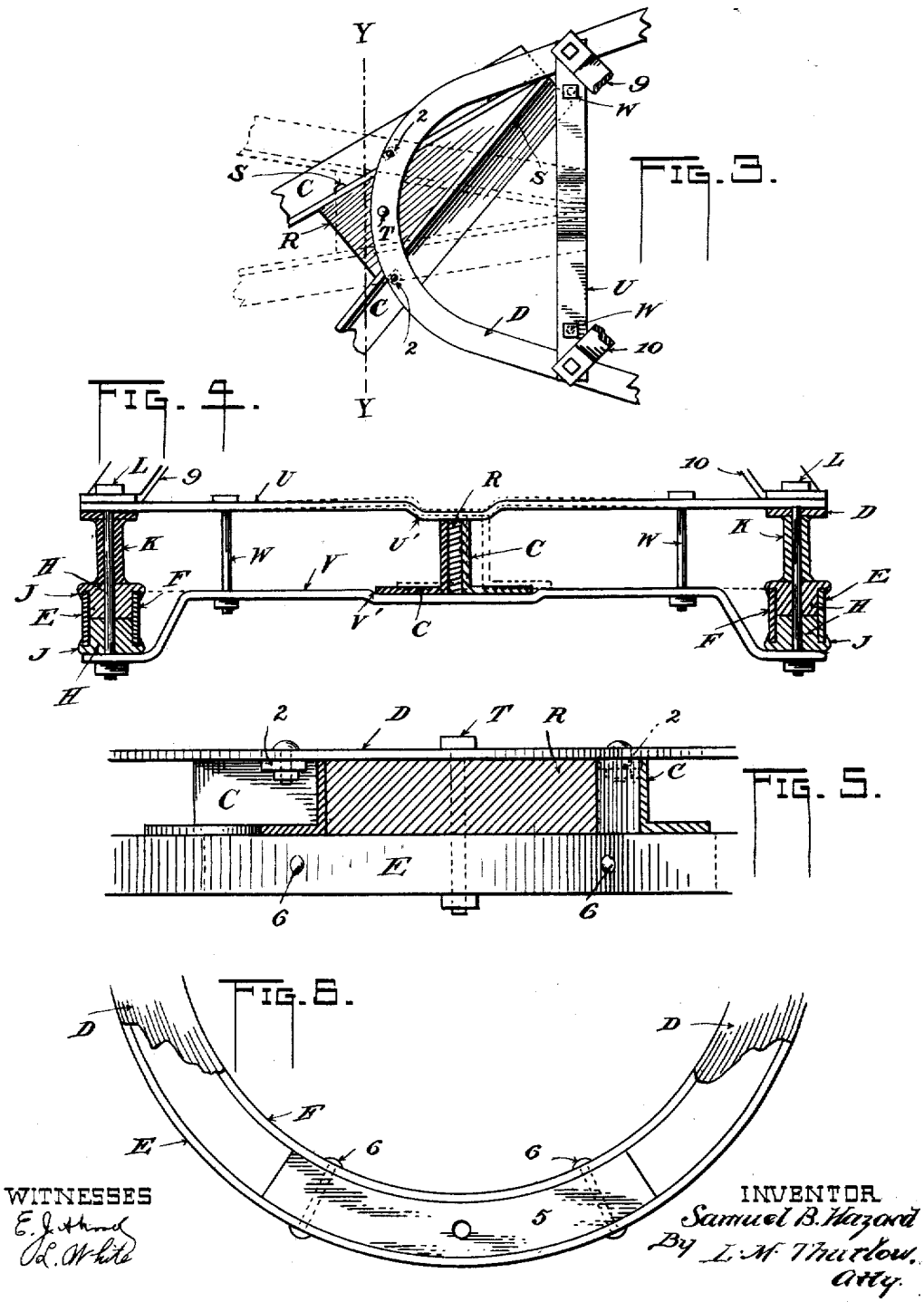

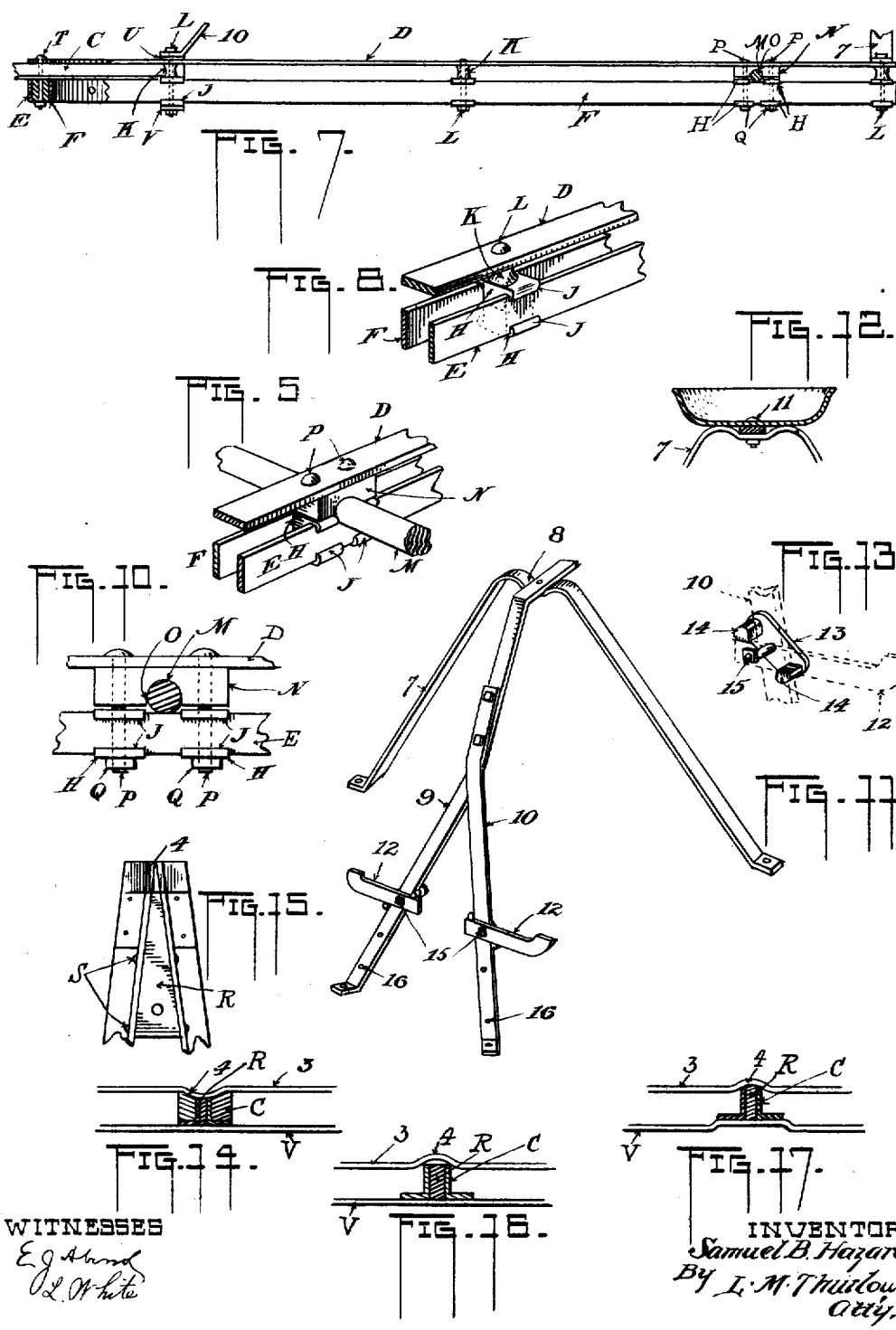

UNITED STATES PATENT OFFICE.

SAMUEL B. HAZARD, OF PEORIA, ILLINOIS.

RIDING ATTACHMENT FOR HARROWS.

No. 902,879. Specification of Letters Patent. Patented Nov. 3, 1908.

Application filed December 17, 1906. Serial No. 348,346.

*To all whom it may concern:*

Be it known that I, SAMUEL B. HAZARD, citizen of the United States, residing at Peoria, in the county of Peoria and State of Illinois, have invented certain new and useful Improvements in Riding Attachments for Harrows; and I do hereby declare that the following is a full, clear, and exact description of the invention, which will enable others skilled in the art to which it appertains to make and use the same.

This invention pertains to riding attachments for harrows.

The primary object of my invention is to provide a new means by which the cart will be held rigid with respect to its reach when pursuing a straight-ahead course, said means, however, arranged to permit the cart to swing relative to the reach when the harrow is turned from such course.

Another object is to provide means by which to hold the cart so as to provide against voluntary lateral motion thereof, such means having provision for adjustment for the purposes to be pointed out.

A further object is to provide a trussed frame for a harrow cart which will be rigid and light in weight.

The invention consists further in such details of construction as will be pointed out hereinafter and afterwards form a part of the claims.

In the drawings presented herewith, Figure 1 is a top view of the harrow cart showing portions of the harrow and a reach for connecting the harrow and said cart. Fig. 2 is a side elevation of the same. Fig. 3 is a top view of a portion of the harrow-cart-frame and the reach shown in Fig. 1 but much enlarged. Fig. 4 is a vertical transverse section, except as to certain members, taken on line X X, Fig. 1, and much enlarged. Fig. 5 is a transverse sectional elevation on line Y Y, Fig. 3, greatly enlarged. Fig. 6 is a top view of the lower part of a portion of the cart-frame shown in Figs. 1 and 3, being greatly enlarged. Fig. 7 is a side elevation of the frame of the cart, part being in section. Fig. 8 is a perspective view of a portion of the frame showing means for clamping its parts firmly together. Fig. 9 is a perspective view of a part of the frame showing clamping means for the axle of the cart. Fig. 10 is a side elevation of the same. Fig. 11 is a perspective view of a seat-supporting frame, Fig. 12 is a front elevation of a portion of the seat-frame showing the seat and a portion of the frame in part section. Fig. 13 is a perspective view of a foot rest clamp showing the foot rest and part of the seat frame in dotted lines. Fig. 14 is a front elevation of a form of reach-centralizing-means as a modification of that shown in Fig. 4. Fig. 15 is the end of a reach used in connection with the form of centralizing means shown in Fig. 14. Fig. 16 is another modification of the means for centralizing the reach. Fig. 17 is still another modification thereof. Fig. 18 is a modification of the means for centralizing the reach with respect to the cart-frame, this view being a cross sectional elevation as viewed from the front of the implement.

In the drawings the harrow is indicated by the letter A forward of which is a draft bar B having secured thereto the forward ends of convergently disposed reach bars C the rear ends of which are connected in suitable manner while D E F indicate the principal frame members of the cart. The cart-frame has pivotal relation with the reach bars at or near the connected ends substantially as shown. The reference letter G indicating the wheels of the cart.

Thus far the device is much the same as devices of this nature now in use, but I shall now describe the implement more specifically in order to clearly and fully make known my improvements.

The frame of the cart is composed of three members, an upper flat U-shaped bar D and two vertically disposed bars E and F beneath and spaced apart from the bar D and from each other, these also being U-shaped to conform to the shape of said bar D as shown in the figures. These bars E and F are spaced apart as particularly shown in Fig. 4 by means of spacing blocks H having projecting lips J to engage the opposite edges of said bars, said blocks meeting substantially midway of the width of said bars. It will be seen that one pattern answers for both blocks one of the latter being inverted upon the other one to meet it within the bars E F. These spacing blocks are disposed at intervals around the frame as shown to properly brace and strengthen the bars E and F. They also support the upper bar D by means of spools K which serve to properly space the said top bar D from the bars E F. Bolts L pass through the spools, the blocks and said bar D, and all together serve to form a thoroughly rigid trussed frame very strong, of light weight, and low in cost. The bars D, E and F are all preferably bent upon forms to properly shape them, the inner bar F being bent upon a smaller form than the outer bar in order that both can be properly spaced apart at all points. The axle of the cart is denoted by M and this lies between the upper and lower frame portions as shown in Figs. 7, 9 and 10 there being a block N having a notch O in its under side for seating the axle therein, the latter resting upon the lower bars E F. A pair of the blocks H, already described, are situated at each side of and below the axle, and bolts P extend through the top bar D, the block N and the said blocks H and each receives a nut Q at its lower end. The block N and the axle in this instance serve the same purpose as the spools K, in that they hold the bar D and aid in strengthening the frame. The reach between the harrow and the cart is preferably composed of angle bars, between the rear connected ends of which is a block R held in place by bolts or rivets S, Fig. 1, and is pivoted some distance forward of its rear end to the cart-frame by the bolt T. Extending across the cart-frame is an upper and a lower bar U and V respectively, each end of the former being held stationary upon the bar D, the latter bar V being held beneath the bars E F against one of the blocks H by one of the bolts L already described, this being clearly shown in Fig. 4. The position of these bars is such, with reference to the pivot of the reach, that the rearwardly extending free end of the latter will lie between them, said bars serving as a guide for the reach and preventing a rocking or vertical tilting motion of the reach and cart-frame relatively. These bars U V, however, serve a further and more important purpose than this.

Referring to Fig. 4, it will be seen that the top bar U has a depression U' at its middle, and that the lower bar V has a similar but somewhat longer depression V'. At a position between the ends of the latter two bars and their depressions, found to be most advantageous, bolts W are placed by which to add rigidity to the bars and by which also to adjust them by bringing them closer together or for permitting them to separate as the need of the case may require. By thus being "tied" together a certain amount of spring in both bars will be had though in practice the upper one will yield the most as will be evident because of straighter form than the lower one whose ends outside the bolts W are bent downward giving it greater rigidity, there not being as great length to permit springing as with the bar U. The depression in the lower bar is of sufficient extent to just receive the horizontal limbs of the reach as shown, the upper downward bend U' serving to hold said reach in said depression. In many implements of this character the cart is subject to lateral movement upon its pivot relative to the reach due to the wheels meeting obstructions thereby producing a jerky motion which is a source of much discomfort to the rider. If the ground over which the cart travels is smooth no trouble of this kind would result, or if both wheels at the same instance were to strike an obstruction of the same size there would be no lateral motion imparted, but when but one wheel strikes an obstruction it is retarded for a moment in its forward movement causing the lateral jerky motion described. It is my purpose to provide a construction that will prevent this lateral movement but at the same time readily permit the cart and reach to pivot relatively whenever the harrow moves out of a straight-ahead course. In practice the reach will find the central position shown in Figs. 1 and 4 at which place it will lie within the depression V' formed in the lower bar V, being held therein by the upper bar U. The downward spring of the bar U keeps sufficient pressure upon the reach to hold it in the depression V' while the wheels traverse any sort of rough ground. If, however, the harrow is turned out of a straight line the reach will rise out of the said depression upon the upper surface of the bar V as indicated by dotted lines in Fig. 4, due to being swung on its pivot at T. As this movement results the bar U, which yields relatively to both the reach and the frame carrying it is sprung or forced upward as indicated in broken lines substantially the same distance that the reach rises in reaching the straight horizontal surface of the bar V, and after the reach has passed from beneath the downward bend of the bar U the latter by its resiliency will return to its normal position. The distance then between the bars U and V at each side of their central depressions is substantially the same as at the central position between the position at U' and V', and the reach is now free to move between the bars and may pass outward as shown in Fig. 3 beneath the frame member D and upon the members E F it being noted in Fig. 4 that the upper edges of the bars E F are in line with the upper surface of the bar V as indicated by broken lines in that figure thus permitting the reach to swing as described and shown in Fig. 3 to its outward limit beneath the bar D. I provide suitable stops at 2 secured at the frame portion D by which to limit the swing of the reach in either direction, the vertical limb of each reach member contacting with said stops as indicated. The bolts W hereinbefore described, which serve to adjust the bar U to obtain any degree of pressure upon the reach as hereinbefore mentioned, are placed at a position where the reach will not interfere with them. It is understood, however, that other means may be employed in place of the bolts W for accomplishing the purposes for which they are intended as I do not wish to limit myself to any particular means in this respect. The bolts may be omitted altogether and by making the bar U of sufficiently heavy gage of steel it can be made to have the required downward force. I do not wish to limit myself to the particular form of bend in either of the bars U V I having shown in Figs. 14, 16 and 17, other forms of these bends, though still others may be used.

In Fig. 14 it will be noted that the upper bar represented by 3, which corresponds to U, in the other figures is provided with a downward bend while the lower bar is straight. The reach is provided with a depression at 4 into which the downward bend is designed to seat. Again, in Fig. 16, the upper bar is provided with an upward bend into which the reach may enter; the distance between the two bars in this case being somewhat decreased so that the reach will be held by the recess created by the bend. In Fig. 17 the bends in the two bars are practically reversed from the form shown in Fig. 4 by which substantially the same results are obtained. A variety of forms are thus possible by which to attain the end sought. The relation between the reach, the cart-frame, and the bars U V is such that when the reach leaves the bars it immediately enters between the members of the cart-frame so that it is guided in its movements between some parts of the implement. Evidently, there will be sufficient tilting movement of the reach upon its pivot at T to allow it to pass into the depression V' of the bar V or the latter member may be permitted to spring sufficiently to depress as the reach moves out of the central position. In this case the bars U and V will both be slightly sprung apart.

From the construction described it is clear that the cart can be held perfectly rigid with reference to the reach while moving straight ahead regardless of the roughness of the soil while at the same time the clamping effect of the means described will be overcome immediately the harrow is turned from the straight course, the force exerted by the reach due to its great leverage being greater than the power exerted by the said means. At the forward end of the cart-frame a block 5 is inserted between the bars E and F the same being secured therebetween by means of rivets or bolts 6 or other suitable means, and through this the pivoting bolt T extends as already explained thus making a solid rest for the reach.

Fig. 18 shows how I may change the means for centralizing and holding the cart rigid. I secure a stiff spring to each side of the reach these springs extending parallel to the axle of the cart or preferably in a semicircle to travel about the pivot of the reach as a center and each having a length sufficient to work within the cart-frame and prevent tilting of the reach and cart relatively. At proper positions, determined by the amount of separation of the limbs of the frame the springs a are provided with indentations b for engaging a lug c of the same shape as said indentation. At the central position the lugs hold the reach rigid. When turning out of a straight-ahead course the reach will force the lugs and indentations out of engagement. In this form the reach carries the springs instead of their being carried by the cart-frame.

I provide a seat-frame which is clearly shown in perspective in Fig. 11. It consists of an A-shaped bar 7 having a downward bend at its apex for receiving the upper horizontal extension of a bent bar 9. The lower ends of the bars 7 are secured at the rear end of the cart-frame-extensions by the same bolts which clamp the said extensions the blocks H, and spool K together, as hereinbefore described, and the lower end of the said bar 9 is secured by the same bolt that holds the bars U V upon the cart-frame. A bent bar 10 similar to the bar 9, but shorter, is secured at its lower extremity to the other side of the cart-frame in the same manner, its upper end being secured to the bar 9 by any good means. The top of the frame thus formed provides a large bearing surface for the seat, the latter resting upon the upward bends of the bars 7 as shown in Fig. 12 and also resting upon the horizontal extension of the said bar 9, and a bolt 11 clamps the seat and the bars 7 and 9 firmly together. On the bars 9 and 10 described, horizontal foot rests 12 are placed and held in position by means of a member 13, Fig. 13, having at each extremity a substantial triangular lug 14 so positioned with relation to the members 9 and 10 and said foot rest members 12 that the latter are prevented from tipping downward, this being clearly shown in the figures referred to without further description. Bolts 15 serve to clamp the members 13 in place behind the bars 9 and 10 together with the said foot rests. Holes 16 are punched at intervals in the bars by which to permit vertical adjustment of the said rests.

To my knowledge a combined harrow and cart having the advantages possessed by mine has not heretofore been constructed. Neither am I aware of a cart frame constructed as mine is which possesses the lightness and strength afforded by the peculiar construction described and shown. My cart can be produced at about the same cost as others, and its value therefore will be at once seen. As intimated hereinbefore, it is not my intention to be confined to any particular structure as to any of the parts entering into the construction of the implement.

In my harrow-cart the means for keeping rigid relation between the cart-frame and the reach of the harrow is not dependent in any way upon the disposition of the weight of the rider since he can be seated forward of the axle or behind, or just above it as may be desired, and in using an upper and a lower member, as U V for the reach, the operation is not affected in any way by riders of varying weight.

Having thus described my invention, I claim:

1. In a riding attachment, an earth stirring implement, a wheeled frame in the rear thereof, a reach connecting the implement and the frame and adapted for a lateral pivotal movement with respect to said frame, but otherwise relatively rigid with respect thereto, and yielding means carried by the frame to automatically engage the reach for the purposes set forth.

2. In a riding attachment, an earth stirring implement, a wheeled frame in the rear thereof, a reach connecting the implement and the frame and adapted for a lateral pivotal movement with respect to said frame but otherwise relatively rigid with respect thereto, and means carried by the frame and adapted to yield automatically and to engage and release the reach for the purposes set forth.

3. In a riding attachment, an earth stirring implement, a wheeled frame in the rear thereof, a reach connecting the implement and the frame but otherwise relatively rigid with respect thereto, and means carried by the frame in the rear of the pivotal connection of the frame and reach and adapted to yield with respect to the frame for automatically engaging and releasing said reach for the purposes set forth.

4. In a riding attachment of the class described, a wheeled frame, a reach extending forward therefrom and adapted to have a lateral swinging movement with respect thereto, and means on the frame in engagement with the reach and adapted to yield automatically for positively and centrally holding the reach and preventing lateral swinging motion of the cart while moving in a straight ahead course, such means also permitting swinging relation of the frame and reach only when the harrow is turned out of a straight-ahead course.

5. In a riding attachment of the class described, a wheeled frame, a reach extending forward therefrom and adapted to have a lateral swinging movement with respect thereto, and yielding means carried by the frame and with which the reach has slidable relation and by which the latter is positively and automatically engaged to prevent the wheeled frame having lateral movement while pursuing a straight-ahead course.

6. In a riding attachment of the class described, a wheeled frame, a reach connected to it and adapted for swinging movement with respect thereto, yielding means for automatically engaging and holding said reach and wheeled frame in a central position and preventing lateral motion of said frame, and adapted also to automatically free the reach and frame when the reach is moved out of said central position.

7. In a riding attachment of the class described, a wheeled frame, a reach pivoted thereto and adapted to swing laterally with respect thereto, means carried by one of them and adapted to flex and to automatically engage the other for positively holding both the reach and frame relatively rigid while pursuing a straight ahead course, and means for limiting the swinging movement of the said reach and frame relatively.

8. In a riding attachment of the class described, a wheeled frame, a reach attached thereto and adapted for swinging movement with respect thereto, flexible means for automatically locking the said reach and the wheeled frame together and holding them relatively rigid when pursuing a straight-ahead course, such means also automatically releasing the frame and reach to permit them to swing relatively, and means for limiting the movement of the reach and frame relatively.

9. In a riding attachment of the class described, a reach, a trailing wheeled-frame drawn thereby and with which said frame is adapted to have swinging relation, flexible means for holding the frame and reach in rigid relation while pursuing a straight-ahead course for the purposes set forth, such means permitting lateral movement of the reach on its pivot in traveling out of said straight-ahead course, and automatically locking the frame and reach in rigid relation when again pursuing the straight-ahead course.

10. In a riding attachment of the class described, a wheeled frame, a reach extending forward therefrom and adapted for a swinging movement laterally with respect thereto, and means on one of them adapted to flex and also adapted for automatically securing the two in rigid relation when pursuing a straight-ahead course.

11. In a riding attachment of the class described, a wheeled frame, a reach adapted for swinging movement with respect thereto, and means on one of them for automatically securing the two in rigid relation when pursuing a straight ahead course said means being adjustable for producing more or less friction between the frame and the said reach, for the purposes described.

12. In a riding attachment of the class described, a wheeled frame, a reach pivoted thereto and extending forward therefrom and having an extension in the rear of its pivot, and flexible means carried on one of the described members rearward of the pivot and adapted to automatically engage the other member at the central position of the portions relatively and to automatically release them, said means adapted to yield relative to both said members.

13. In a riding attachment of the class described, a wheeled frame, a reach pivoted thereto and extending forward therefrom and having an extension in the rear of its pivot, and flexible means carried by one of the described members rearward of the pivot and adapted to automatically engage the other member at the central position of said members relatively and adapted to yield with respect to both members and to automatically release said members at the time and for the purposes set forth.

14. In a riding attachment of the class described, a wheeled frame, a reach pivoted thereto and extending forward therefrom, flexible means carried by one of them and adapted to yield with respect to both of them and adapted to automatically lock the frame and reach relatively at the central position and automatically release them for the purposes set forth.

15. In a riding attachment of the class described, a reach, a wheeled frame drawn in the rear thereof and adapted for swinging movement with respect thereto, and flexible means carried by one of them and adapted to yield automatically with respect thereto and also with respect to the other and adapted to lock the reach and frame at the time and for the purposes set forth.

16. In a riding attachment of the class described, a wheeled frame, a reach adapted for swinging movement with respect thereto, and adjustable means for automatically securing the frame and reach in rigid relation when the two reach a position for straight ahead travel.

17. In a riding attachment of the class described, a reach, a wheeled frame drawn in the rear thereof and adapted for a lateral swinging movement with respect thereto, and adjustable yielding means for automatically securing the frame and reach in rigid relation at the central position, such means adapted also to automatically release the frame and reach at the time and for the purposes set forth.

18. In a riding attachment of the class described, a reach, a wheeled frame drawn behind the same, the reach and frame adapted to swing relatively, flexible means secured to one of the parts and adapted to yield with reference to both of them, there being provision therethrough for automatically engaging and automatically releasing the parts for the purposes described.

19. In a riding attachment of the class described, a reach, a wheeled frame drawn therebehind, said reach and frame adapted for a lateral swinging movement relative to one another, an upper and a lower member secured on the wheeled frame and between which the reach extends and within which it is adapted to swing, each said member having a central depression, the measurement between said members at such depressions being normally less than the thickness of the reach, the said depressions adapted, by their relation to one another and to the reach, to hold the latter in its central position for the purposes set forth.

20. In a riding attachment of the class described, a reach, a wheeled frame drawn therebehind, companion members carried by the frame and inclosing the reach and between which the latter is adapted to swing, there being provision for holding the reach in its central position, and means for adjusting one of the members in the direction of its companion to vary the distance between the two.

21. In a device of the class described, a reach, a wheeled frame drawn therebehind, companion members carried by the frame for inclosing the reach and between which the latter is adapted to swing, there being provision by which to hold the reach in a central position through said members, one of them adapted to permit said reach to be liberated.

22. In a device of the class described, a reach, a wheeled frame drawn therebehind, companion members carried by the frame for inclosing the reach and between which the latter is adapted to swing, there being provision by which to hold the reach in a central position through said members, one of the latter adapted to permit said reach to be liberated, and means for varying the distance between said members for the purposes set forth.

23. In a riding attachment of the class described, a wheeled frame, a reach pivoted thereto and extending rearward of its pivot, members carried by the frame in the rear of the pivot and arranged to receive the rear end of the reach and between which the latter is adapted to swing, there being a bend in one of such members to receive the reach, the other member arranged to hold the reach relative to said bend and adapted to flex to permit said reach to swing out of said recess.

24. In a riding attachment of the class described, a wheeled frame, a reach pivoted thereto and extending rearward of its pivot, members carried by the frame in the rear of the pivot and arranged to receive the rear end of the reach and between which the latter is adapted to swing, there being a bend in one of such members to receive the reach, the other member arranged to hold the reach relative to said bend and adapted to flex to permit said reach to swing out of said recess, and means for adjusting the members relatively.

25. In a riding attachment of the class described, a wheeled frame, a reach pivoted thereto and extending forward therefrom, companion members carried on the frame and inclosing and guiding said reach, one of the said members having provision for engaging the reach, the other member adapted to flex and adapted also to hold the reach and the first said member in engagement at the central position, and adapted by its flexibility to permit the reach and members to disengage for the purposes described.

26. In a riding attachment of the class described, a wheeled frame, a reach adapted for a swinging movement with respect thereto in a horizontal plane, means for holding the reach in rigid relation thereto at a central position for the purposes set forth, such means inclosing the reach above and below and preventing vertical tilting motion between the frame and reach, the inclosing portions of such means adapted to separate due to the swing of the reach when the harrow is turned out of a straight-ahead course, the said members approaching one another to confine the reach in its central position when again pursuing the straight-ahead course.

27. In a riding attachment of the class described, a wheeled frame, a reach adapted for swinging movement with respect thereto in a horizontal plane, means for securing the reach and frame in rigid relation when pursuing a straight ahead course, such means inclosing the reach above and below and bent to form a receiving recess for the reach when the latter is at its position for the said straight-ahead course.

28. In a riding attachment of the class described, a wheeled frame, a reach adapted to have swinging movement with respect thereto in a horizontal plane, said reach extending rearward of its pivot, a member above and a member below the rearward extension of the reach, there being a bend at the middle of one of the members for receiving the reach and holding it in a central position for the purposes set forth.

29. In a riding attachment of the class described, a wheeled frame, a reach adapted to have swinging movement in a horizontal plane with respect thereto, said reach extending rearward of its pivot, a member above and a member beneath the rearward extension of the reach, there being a bend in the middle of one of the members to form a recess for receiving the reach, and a corresponding bend in the other member for contacting with and holding the reach immovably within the recess at a central position at the time and for the purposes set forth.

30. In a riding attachment of the class described, a wheeled frame, a reach adapted to have swinging movement in a horizontal plane with respect thereto, said reach extending rearward of its pivot, a member above, and a member beneath the rearward extension of the reach, there being a recess at substantially the middle of the lower member for receiving the reach, and a downward bend in the upper member below the plane thereof for contacting with the reach and holding it firmly within the recess by natural downward pressure due to the spring of said upper member.

31. In a riding attachment of the class described, a wheeled frame, a reach adapted to have swinging movement in a horizontal plane with respect thereto, said reach extending rearward of its pivot, a member above and a member beneath the rearward extension of the reach, correspondingly disposed bends in both said members, one of them forming a recess for receiving the reach, the other forming a contacting portion for and holding the reach in said recess, the member carrying said contacting portion adapted to be sprung away from its companion member by the reach when carried out of the recess.

32. In a riding attachment of the class described, a wheeled frame, a reach adapted to have swinging movement in a horizontal plane with respect thereto, said reach extending rearward of its pivot, a member above and a member beneath the rearward extension of the reach, correspondingly disposed bends in both said members one of them forming a recess for receiving the reach, the other forming a contacting portion for the reach for holding it in said recess, the member carrying said contacting portion adapted to be sprung away from its companion member when the reach is forced out of the recess, the companion members permitting relative swinging movement of the wheeled frame and the reach at each side of the holding means described, at the times and for the purposes explained.

33. In a riding attachment of the class described, a wheeled frame, a reach adapted to have swinging movement with respect thereto, means in the vicinity of the middle line of the frame for receiving and holding the reach in a central position, such means comprising inclosing members for said reach, an adjustable member for imparting more or less tension to the said inclosing means.

34. In a riding attachment of the class described, a wheeled frame, horizontally disposed substantially parallel members thereon and also substantially parallel to the axle of the wheeled frame, a reach adapted for swinging movement with respect to the frame and said members and extending between said members, a recess formed in one of the members for receiving the reach, a downwardly bent portion in the opposite member for contacting with and holding the reach in the recess, and an adjusting bolt connecting both members at each side of the recess for the purposes set forth.

35. In a riding attachment of the class described, a wheeled frame, a reach adapted for swinging movement with respect thereto, and inclosing members for guiding the reach in its horizontal swinging motion at each side of the central position and for locking the reach at said central position.

36. In combination with an upper and lower frame portion of a wheeled harrow-cart, a forwardly extending reach positioned between the said portions and pivoted thereto, and means carried by the frame for automatically and yieldingly engaging and releasing the reach for the purposes described.

37. In combination with the double frame of a wheeled harrow-cart, a reach pivoted between the portions of the frame and extending rearward of its pivot, and means carried by the frame to yieldingly engage the rear end of the reach to hold it at its central position.

38. In combination with an upper and lower frame portion of a wheeled harrow-cart, a forwardly extending reach pivoted between said frame portions, said reach having an extension rearward of its pivot, and means carried by the frame to automatically and yieldingly engage and release the reach for the purposes described.

39. The combination of a frame for a harrow-cart, a second frame superimposed thereon, means for spacing the frames apart, means to hold them in rigid relation, a reach pivoted to and between the members, means carried by said frames between which the reach extends for automatically and yieldingly engaging and releasing the reach at the time and for the purposes set forth.

In testimony whereof I affix my signature, in presence of two witnesses.

SAMUEL B. HAZARD.

Witnesses:
E. J. ABERSOL,
L. M. THURLOW.